(12) United States Patent
Obukhov et al.

(10) Patent No.: US 8,938,624 B2
(45) Date of Patent: Jan. 20, 2015

(54) ENCRYPTION KEY DESTRUCTION FOR SECURE DATA ERASURE

(75) Inventors: Dmitry Obukhov, San Jose, CA (US); Bin Tan, Cupertino, CA (US)

(73) Assignee: LSI Corporation, San Jose, CA (US)

( * ) Notice: Subject to any disclaimer, the term of this patent is extended or adjusted under 35 U.S.C. 154(b) by 73 days.

(21) Appl. No.: 13/234,134

(22) Filed: Sep. 15, 2011

(65) Prior Publication Data

US 2012/0093318 A1 Apr. 19, 2012

Related U.S. Application Data

(60) Provisional application No. 61/383,017, filed on Sep. 15, 2010.

(51) Int. Cl.
*H04L 9/00* (2006.01)
*H04K 1/00* (2006.01)
*G06F 21/62* (2013.01)

(52) U.S. Cl.
CPC .... *G06F 21/6209* (2013.01); *G06F 2221/2143* (2013.01)
USPC ............................................ 713/193; 380/59

(58) Field of Classification Search
None
See application file for complete search history.

(56) References Cited

U.S. PATENT DOCUMENTS

| | | | | |
|---|---|---|---|---|
| 4,301,486 A * | 11/1981 | Brown et al. | .......... | 360/60 |
| 4,593,384 A * | 6/1986 | Kleijne | .......... | 365/228 |
| 4,811,288 A * | 3/1989 | Kleijne et al. | .......... | 365/52 |
| 5,469,557 A * | 11/1995 | Salt et al. | .......... | 711/103 |
| 6,234,389 B1 * | 5/2001 | Valliani et al. | .......... | 235/380 |
| 6,757,832 B1 * | 6/2004 | Silverbrook et al. | .......... | 713/194 |
| 7,093,139 B2 * | 8/2006 | Silverbrook et al. | .......... | 713/194 |
| 7,246,098 B1 * | 7/2007 | Walmsley | .......... | 705/64 |
| 7,494,062 B2 * | 2/2009 | Holz et al. | .......... | 235/435 |
| 7,743,262 B2 * | 6/2010 | Walmsley | .......... | 713/194 |
| 7,747,541 B2 * | 6/2010 | Walmsley et al. | .......... | 705/67 |
| 7,757,084 B2 * | 7/2010 | Walmsley et al. | .......... | 713/168 |
| 7,805,609 B2 * | 9/2010 | Holz et al. | .......... | 713/168 |
| 7,845,553 B2 * | 12/2010 | Holz et al. | .......... | 235/379 |
| 7,941,661 B2 * | 5/2011 | Walmsley et al. | .......... | 713/166 |
| 7,945,792 B2 * | 5/2011 | Cherpantier | .......... | 713/194 |
| 7,962,767 B2 * | 6/2011 | Walmsley et al. | .......... | 713/194 |
| 8,127,151 B2 * | 2/2012 | Nelson et al. | .......... | 713/193 |
| 2005/0195975 A1 * | 9/2005 | Kawakita | .......... | 380/30 |
| 2008/0129037 A1 * | 6/2008 | Roth et al. | .......... | 283/85 |
| 2009/0057421 A1 * | 3/2009 | Suorsa et al. | .......... | 235/494 |
| 2009/0106563 A1 * | 4/2009 | Cherpantier | .......... | 713/194 |
| 2009/0327756 A1 * | 12/2009 | Pekowsky | .......... | 713/192 |

\* cited by examiner

*Primary Examiner* — Christopher Revak
(74) *Attorney, Agent, or Firm* — PatentVentures; Bennett Smith; Korbin Van Dyke (57) ABSTRACT

Techniques for encryption key destruction for secure data erasure via an external interface or physical key removal are described. Electrical destruction of key material retained in a memory of a storage device renders the device securely erased, even when the device is otherwise inoperable. The memory (e.g. non-volatile, such as flash) stores key material for encrypting/decrypting storage data for the device. An eraser provides power and commands to the memory, even when all or any portion of the device is inoperable. The commands (e.g. erase or write) enable zeroizing or destroying the key material, rendering data encrypted with the destroyed key material inaccessible, and therefore securely erased. Alternatively, the memory is a removable component (e.g. an external security device or smartcard) coupled to the device during storage operation. Removing and physically destroying the memory renders the device securely erased. The device and/or the memory are sealed to enable tamper detection.

27 Claims, 7 Drawing Sheets

ENCRYPTION KEY DESTRUCTION FOR SECURE DATA ERASURE

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application Ser. No. 61/383,017, filed 15 Sep. 2010, first named inventor Dmitry OBUKHOV, and entitled ENCRYPTION KEY DESTRUCTION FOR SECURE DATA ERASURE.

BACKGROUND

1. Field

Advancements in secure data erasure are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Synopsis

The invention may be implemented in numerous ways, including as a process, an article of manufacture, an apparatus, a system, a composition of matter, and a computer readable medium such as a computer readable storage medium (e.g. media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

Elsewhere herein various shorthand abbreviations, or acronyms, refer to certain elements. The descriptions of at least some of the acronyms follow.

| Acronym | Description |
|---|---|
| EEPROM | Electrically Erasable Programmable Read Only randomly accessible Memory |
| FIPS | Federal Information Processing Standards |
| HDD | Hard Disk Drive |
| NVRAM | Non-Volatile Read/write randomly Accessible Memory |
| PCB | Printed Circuit Board |
| SATA | Serial Advanced Technology Attachment (Serial ATA) |
| SSD | Solid State Disk |
| TPM | Trusted Platform Module |

Cryptographic erase of data storage devices is performed in various usage scenarios. The data storage devices are in a physically protected facility, such as a mechanical case or enclosure. The data storage devices are enabled for non-volatile data retention, and include data storage devices using technologies such as mechanical technologies, electrical technologies, and optical technologies. Some specific examples of a data storage device are an HDD and an SSD. Overall security control is improved, in some situations, using a relatively high performance, while relatively low cost and easy to operate mechanism, to perform cryptographically secure data erasure of the data storage devices.

In some usage scenarios, a key for encrypting data in a data storage device is unique and associated with the data storage device itself. The key is intended to be protected from access from outside of the device so that any data encrypted in the device with the key is secure "forever" (in cryptographic terms) in a physically protected facility (such as a drive case or enclosure). Complexities arise if (or when) the device is damaged and leaves a secure data center for repair (such as by a manufacturer or a third party). Before the device leaves the data center, destruction of the key enables secure cryptographic erasure of the encrypted data.

Techniques for encryption key destruction for secure data erasure via an external interface or physical key removal are described. A storage device is rendered securely erased by electrical destruction of key material retained in a memory of the storage device, even when the storage device is otherwise inoperable. The memory (such as a non-volatile memory implemented via a flash chip) stores key material used to encrypt/decrypt storage data for the storage device. An eraser device is enabled to provide power and commands to the non-volatile memory when all or any portion of the storage device is inoperable. The commands include one or more erase or write commands to zeroize or otherwise destroy all or any portion of the key material, thus rendering any data encrypted with the destroyed key material inaccessible, and therefore securely erased. The non-volatile memory is included on a printed circuit board having an external interface and an edge connector compatible with the eraser device. The external interface and/or the edge connector are sealed to enable tamper detection. As an alternative to the foregoing "in situ" destruction of the key material, the memory is provided on a removable component (such as an external security device or a smartcard) that is coupled to the printed circuit board during storage operation. The storage device is rendered securely erased by removal and physically destruction (such as mechanically or electrically) to destroy the key information. The removable component is sealed (while coupled to the printed circuit board) to enable tamper detection.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A system, comprising:
   a storage device enabled to encrypt and decrypt data according to a cryptographic key stored at least in part in an included non-volatile memory, the storage device having an external interface;
   an eraser device, separate from the storage device, and enabled to couple to the external interface; and
   wherein the eraser device is further enabled to destroy at least the part of the cryptographic key stored in the non-volatile memory, the destroying via at least partial erasure of the non-volatile memory.

EC2) The system of EC1, wherein the eraser device is further enabled to perform the at least partial erasure of the non-volatile memory when one or more components of the storage device are inoperable.

EC3) The system of EC1, wherein the eraser device is further enabled to perform the at least partial erasure of the non-volatile memory when operating power is not supplied to the storage device.

EC4) The system of EC1, wherein the eraser device is further enabled to provide operating power to enable the non-volatile memory to respond to an erase command.

EC5) The system of EC1, wherein the eraser device is further enabled to provide commands to the non-volatile memory via an I$^2$C bus.

EC6) The system of EC1, wherein the external interface comprises a printed circuit board edge connector.

EC7) The system of EC1, wherein the storage device is sealed in a mechanical enclosure having a seal that is broken to couple the eraser device to the storage device.

EC8) The system of EC1, wherein all or any portion of the storage device is sealed in a physically protected facility having a seal that is broken to couple the eraser device to the storage device.

EC9) The system of EC1, wherein the cryptographic key is stored at least in part in a one-time programmable memory.

EC10) The system of EC1, wherein the cryptographic key is determined at least in part in accordance with one or more addresses associated with all or any portion of the data.

EC11) The system of EC1, wherein the cryptographic key is determined at least in part in accordance with one or more programming counts associated with one or more non-volatile memory physical blocks storing all or any portion of the data.

EC12) A system, comprising:
   a removable component comprising a non-volatile memory enabled to store at least a portion of a cryptographic key;
   a storage device enabled to encrypt and decrypt data according to the cryptographic key, the storage device having an interface compatible with the removable component;
   a seal mechanism to detect uncoupling of the removable component from the interface; and
   wherein the cryptographic key is destroyable by mechanical manipulation or electrical overstressing of the removable component.

EC13) The system of EC12, wherein the removable component comprises an external security device or a smartcard.

EC14) A method, comprising:
    encrypting data for storage in a storage device, the encrypting being in accordance with key material, the encrypting being within a secure facility;
    detecting one or more failures of the storage device;
    destroying, in response to the detecting, the key material; and
    transporting, after the destroying, the storage device outside of the secure facility.

EC15) The method of EC14, wherein the secure facility is a trusted site.

EC16) The method of EC14, wherein the secure facility is a tamper-detection enabled enclosure.

EC17) The method of EC14, wherein the key material is first key material, and the encrypting is in accordance with the first key material and the second key material.

EC18) The method of EC 14, wherein the key material is stored in a removable non-volatile memory of the storage device, and the destroying is at least in part via removing the non-volatile memory from the storage device, and then destroying the non-volatile memory device.

EC19) The method of EC14, wherein the key material is stored in a non-volatile memory of the storage device, and the destroying is at least in part via rendering the non-volatile memory inoperable while the non-volatile memory remains in the storage device.

EC20) The method of EC 14, wherein the key material is stored in a non-volatile memory of the storage device, and the destroying is at least in part via erasing at least a portion of the non-volatile memory using an attachable eraser device coupled to the storage device.

EC21) A method, comprising:
    operating a storage device to store encrypted data;
    determining that at least a portion of the storage device is inoperable;
    destroying, after the determining, key material used to decrypt the encrypted data; and
    repairing, after the destroying, the storage device after the destroying.

EC22) The method of EC21, wherein the key material is first key material, and second key material is used in conjunction with the first key material to decrypt the encrypted data.

EC23) The method of EC21, wherein the key material is stored in a removable non-volatile memory of the storage device, and the destroying is at least in part via removing the non-volatile memory from the storage device, and then destroying the non-volatile memory device.

EC24) The method of EC21, wherein the key material is stored in a non-volatile memory of the storage device, and the destroying is at least in part via rendering the non-volatile memory inoperable while the non-volatile memory remains in the storage device.

EC25) The method of EC21, wherein the key material is stored in a non-volatile memory of the storage device, and the destroying is at least in part via erasing at least a portion of the non-volatile memory using an attachable eraser device coupled to the storage device.

EC26) The method of EC23, EC24, or EC25, wherein the operating is within a secured facility, and the repairing is outside of the secured facility.

EC27) The method of EC23, EC24, or EC25, wherein the non-volatile memory is compatible with a form factor of at least one of a USB storage component, a CF storage component, an MMC storage component, an SD storage component, a Memory Stick storage component, and an xD-picture card storage component.

EC28) The method of EC25, further comprising returning the storage device to operation, after the repairing.

EC29) The method of EC28, wherein the key material is original key material, and returning the storage device to operation comprises generating new key material that is different than the original key material.

EC30) The method of EC14 or EC21, wherein the storage device comprises an SSD.

EC31) The method of EC14 or EC21, wherein the storage device comprises an HDD.

EC32) A method, comprising:
    requiring first-user authentication and two key stores held in respective storage media to initialize a storage drive;
    operating the storage drive normally to encrypt and decrypt first-user data using a cipher key generated as a function of the two key stores;
    determining that at least a portion of the storage device is inoperable;
    zeroizing one of the key stores via a key-store external interface, after the determining and without normal power; and wherein the first-user data is unrecoverable, including with the first user authentication.

EC33) A method, comprising:
    requiring first-user authentication and two key stores held in respective storage media to initialize a storage drive;
    operating the storage drive normally to encrypt and decrypt first-user data using a cipher key generated as a function of the two key stores;
    determining that at least a portion of the storage device is inoperable;
    zeroizing one of the key stores via a key-store external interface, after the determining and without normal power, such that the first-user data is unrecoverable, including with the first user authentication; and
    restoring the drive to normal operation with respect to second-user data requiring second-user authentication.

System

Figure 1A:
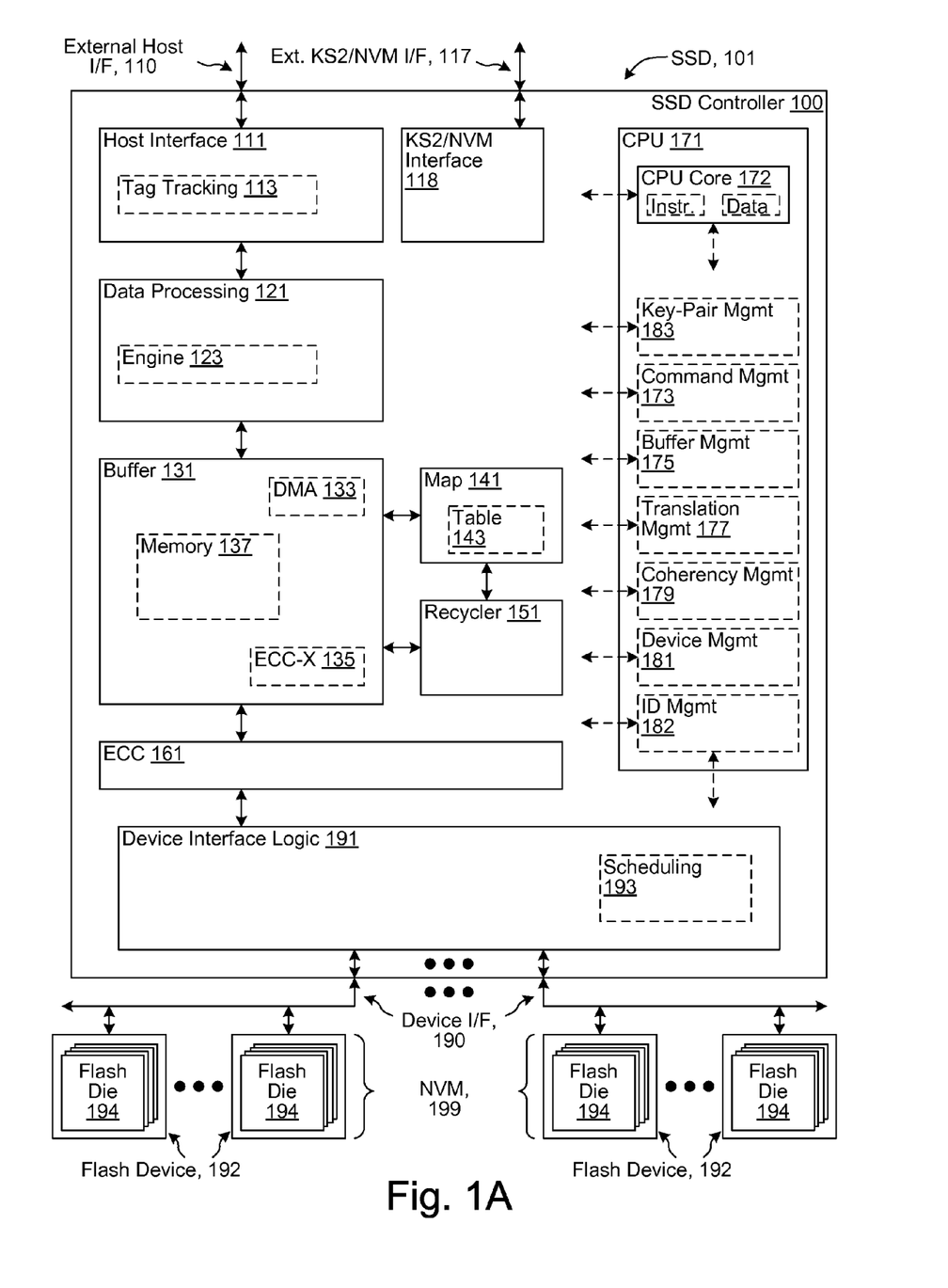
FIG. 1A illustrates selected details of an embodiment of a Solid-State Disk (SSD) including an SSD controller compatible with encryption key destruction for secure data erasure.

FIG. 1A illustrates selected details of an embodiment of SSD 101 including an SSD controller compatible with encryption key destruction for secure data erasure. The SSD controller is for managing non-volatile storage, such as implemented via NVM elements (e.g., flash memories). SSD Controller 100 is communicatively coupled via External KS2-NVM Interface 117 to a NVM comprising KS2 1090 (illustrated in FIG. 1C).

SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more of Flash Device 192. According to various embodiments, Device Interfaces 190 are one or more of: an asynchronous interface; a synchronous interface; a DDR synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each Flash Device 192 has, in some embodiments, one or more individual Flash Die 194. According to type of a particular one of Flash Device 192, a plurality of Flash Die 194 in the particular Flash Device 192 are optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, read-only memory, static random access memory, dynamic random access memory, ferromagnetic memory, phase-change memory, racetrack memory, or any other type of memory device or storage medium.

According to various embodiments, Device Interfaces 190 are organized as: one or more busses with one or more of Flash Device 192 per bus; one or more groups of busses with one or more of Flash Device 192 per bus, where busses in a group are generally accessed in parallel; or any other organization of one or more of Flash Device 192 onto Device Interfaces 190.

Continuing in FIG. 1A, SSD Controller 100 has one or more modules, such as Host Interfaces 111, KS2-NVM Interface 118, Data Processing 121, Buffer 131, Map 141, Recycler 151, ECC 161, Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read; in response the SSD provides read status and/or read data. For another example, the commands include a pre-mapped read command specifying a location in NVM 199 and a length and/or a span of data in read unit quanta. For yet another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability, where redundancy is at a flash device (e.g., multiple ones of Flash Device 192) level and/or a flash die (e.g., Flash Die 194) level instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the map points to a default value to return if the LBAs are read. For example, when processing a de-allocation command, the map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing them. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured to have one or more bands for storing data of different types and/or properties. A number, arrangement, size, and type of the bands is dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Key-Pair Management 183 to access and manage encrypted keys stored in NVM 199 and NVM 1051 enabling secure drive erasure, and; Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

Figure 1B:
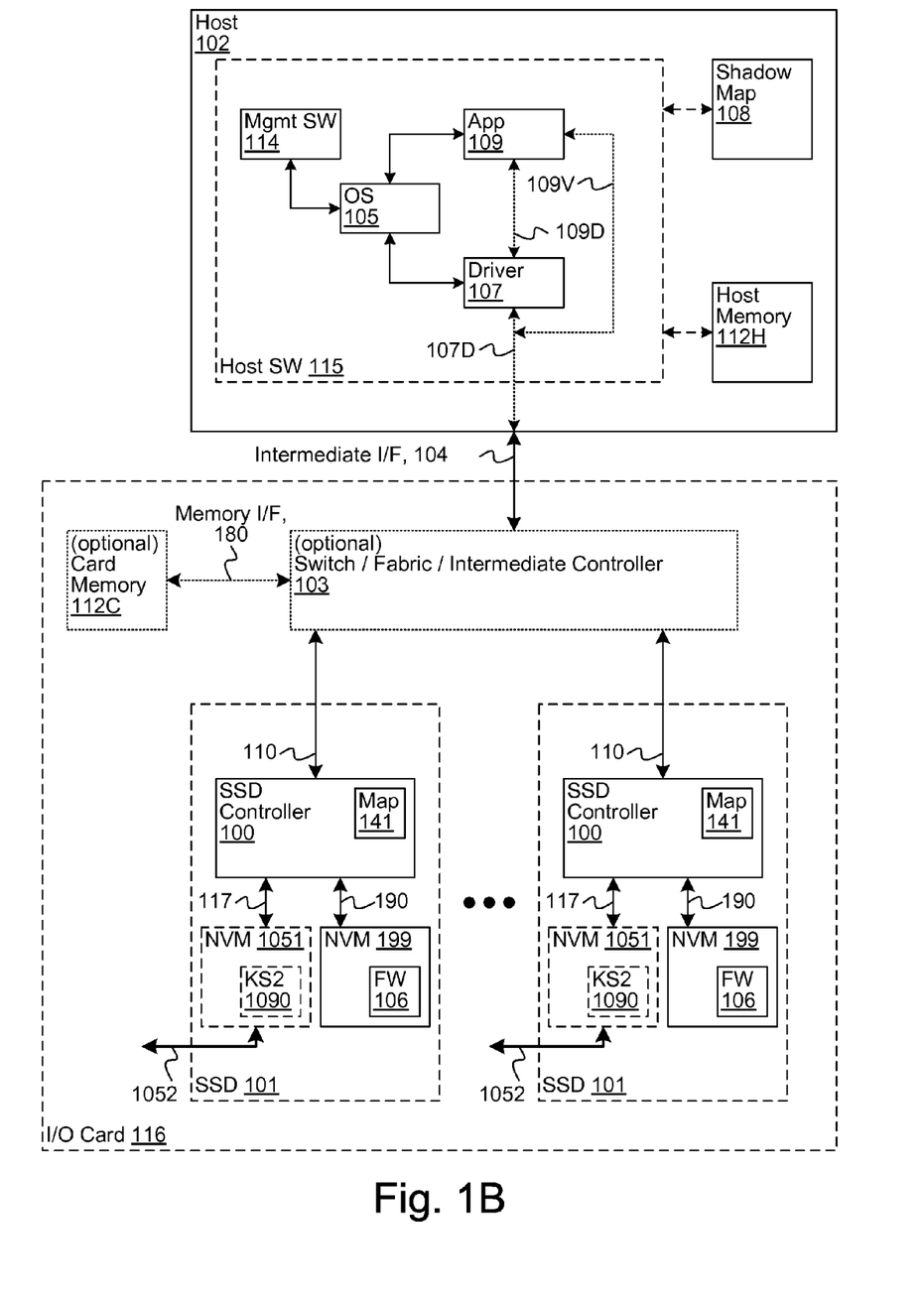
FIG. 1B illustrates selected details of various embodiments of systems including one or more instances of the SSD of FIG. 1A.

FIG. 1B illustrates selected details of various embodiments of systems including one or more instances of the SSD of FIG. 1A. SSD 101 includes SSD Controller 100 coupled to NVM 1051 via External KS2-NVM Interface 117, and further coupled to NVM 199 via Device Interfaces 190. During normal operation, NVM 1051 is generally powered in the same manner as other components of SSD 101 (such as via External Host Interface 110). According to embodiment, to enable ready zeroizing or destruction of encryption key data held in NVM 1051, even when SSD 101 is otherwise non-operational, NVM 1051 is also enabled to be in situ powered and controlled via external coupling 1052, and/or is detectably removable to enable ready external zeroizing, destruction, or replacement. The figure further illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/

Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software F←→I/O Device Communication, e.g. data sent/received to/from one or more of the instances of SSD 101 and from/to any one or more of OS 105 via Driver 107, Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application←→I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application F←→I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The one or more images of firmware correspond, e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments, Host 102 includes Shadow Map 108 as a distinct hardware resource, while in other embodiments, a shadow map is implemented partially or entirely via Host Memory 112H. Examples of Shadow Map 108, the Host Memory 112H, and Card Memory 112C are one or more volatile and/or NVM elements, such as implemented via DRAM, SRAM, and/or flash devices. Further examples of the host memory are system memory, host main memory, host cache memory, host-accessible memory, and I/O device-accessible memory.

As is described in more detail elsewhere herein, in various embodiments Host 102 and/or one or more of the instances of SSD 101 are enabled to access Shadow Map 108 to save and retrieve all or any portions of mapping information usable to convert LBAs to block and/or page addresses targeting one or more portions of I/O device NVM, such as elements of one or more of the instances of NVM 199. Conceptually the Shadow Map follows (e.g. shadows) information in one or more of the instances of Map 141. Information in the Shadow Map is updated via one or more of Host 102 (e.g. in conjunction with issuing a command to an SSD) and one or more of the instances of SSD 101 (e.g. in conjunction with processing a command from a host). In some embodiments and/or usage scenarios (such as some embodiments having I/O Card 116 and using (optional) Card Memory 112C of FIG. 1B as storage for a shadow map), one or more I/O devices, e.g. SSDs, access the shadow map and a host does not. As is also described in more detail elsewhere herein, in various embodiments, one or more of the instances of SSD 101 are enabled to access Card Memory 112C and/or Host Memory 112H to save and restore state information internal to the respective SSD instance, such as when entering and exiting a sleep state.

In some embodiments lacking the Switch/Fabric/Intermediate Controller, the SSD is coupled to the host directly via External Interfaces 110. In various embodiments, SSD Controller 100 is coupled to the host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, an SSD controller and/or a computing-host flash memory controller in combination with one or more NVMs are implemented as a non-volatile storage component, such as a USB storage component, a CF storage component, an MMC storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Figure 1C:
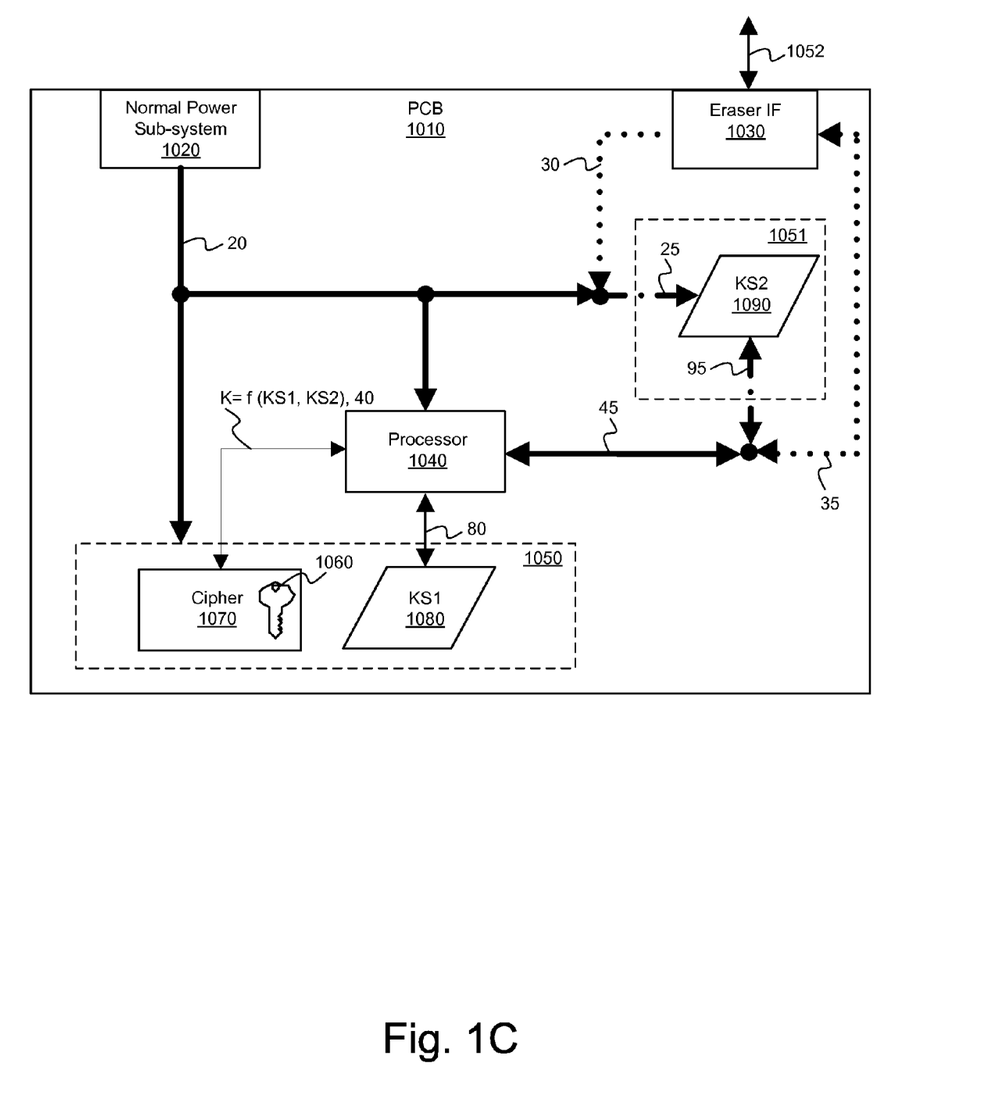
FIG. 1C illustrates selected details of an embodiment of a system providing encryption key destruction for secure data erasure via an external interface, with the system operating in a storage device mode.

FIG. 1C illustrates selected details of an embodiment of a system providing encryption key destruction for secure data erasure via an external interface, with the system operating in a (normal) storage device mode. PCB 1010 implements one or more functions for SSD 101 of FIG. 1A (or other storage device), such as the various functions discussed in conjunction with FIGS. 1A and 1B, and including encrypting/decrypting storage data. The PCB includes Normal Power Subsystem 1020, External Interface 1030, Processor 1040, Cipher Storage 1070 (enabled to store Cipher Key 1060), Key Storage KS1 1080, and Key Storage KS2 1090 coupled as illustrated in the figure. In some embodiments, the PCB includes a storage interface, such as External Host Interface 110 of FIGS. 1A and 1B (which in select embodiments is a SATA interface). In some embodiments, the storage device is a Hard Disk Drive (HDD) rather than an SSD. In various embodiments, the storage device and/or the PCB implement all or any portion of a TPM.

In various embodiments, all or any portion of KS1, KS2, and Cipher Storage 1070 are implemented by one or more NVRAMs, such as one or more flash or EEPROM chips or chips including same. In some embodiments, KS1 and the Cipher Storage are implemented in a same storage medium 1050, which according to embodiment includes a same flash chip or a same rotating disk. In other embodiments, such as those of FIGS. 1A and 1B, KS1 and the Cipher Storage are implemented in NVM 199. In particular embodiments, independent of how KS1 and the Cipher Storage are implemented, KS2 1090 is separately held in NVM 1051, preferably having low-cost, a simple interface, and a small-footprint.

In an illustrative embodiment, Cipher Key 1060 is generated by Processor 1040 with inputs KS1 1080 and KS2 1090 during every power up of the storage device. More specifically, KS1 and KS2 are read, decrypted, and checked for consistency at every power up. If KS1 and KS2 are consistent, then decryption of previously stored data is enabled, and key information is derived from KS1 and KS2. If KS1 and KS2 are inconsistent, then decryption of previously stored data is not possible, and key information that would otherwise have been derived from KS1 and KS2 is set to (new) random values. Every power up continues by determining Cipher Key 1060 based at least in part on the key information. If KS1 and KS2 were consistent, then Cipher Key 1060 enables decryption of data stored before the power up. If KS1 and KS2 were inconsistent, then Cipher Key 1060 (computed from the new random values for KS1 and KS2) is a new value (compared to a previous value of the Cipher Key), and does not enable decryption of data stored before the power up. Whether KS1 and KS2 were consistent or inconsistent, data stored after the power up is encrypted (and decrypted) according to Cipher Key 1060. In some embodiments, determining, encrypting, and writing new values in KS1 and KS2 continue to be performed on every power up. In view of the wear characteristics of the particular media used for storage for one or both of KS1 and KS2, in other embodiments the determining, encrypting, and writing are performed in accordance with predetermined criteria on selected subsequent power-up events. The determining includes injecting some newly computed random information that enables a subsequent consistency check at the next power up.

In various embodiments and scenarios, it is desirable to detect all unauthorized access to KS2, whether via physical opening of the overall enclosure, or mere electronic access via External Interface 1030. External Interface 1030 comprises at least a connector for coupling to an Eraser Device (described below), and according to embodiment further comprises external interface adapter logic as required to enable the Eraser Device to control the non-volatile memory in which KS2 is held. According to embodiment and scenario, External Interface 1030 of the PCB and relevant parts or all of the enclosure are security sealed at a trusted site enabling tamper detection (such as unauthorized breaking of the seal(s), e.g. to read information from key storage KS2). In some embodiments, the sealing is compliant with a security standard, such as FIPS 140.

Operation

Figure 2:
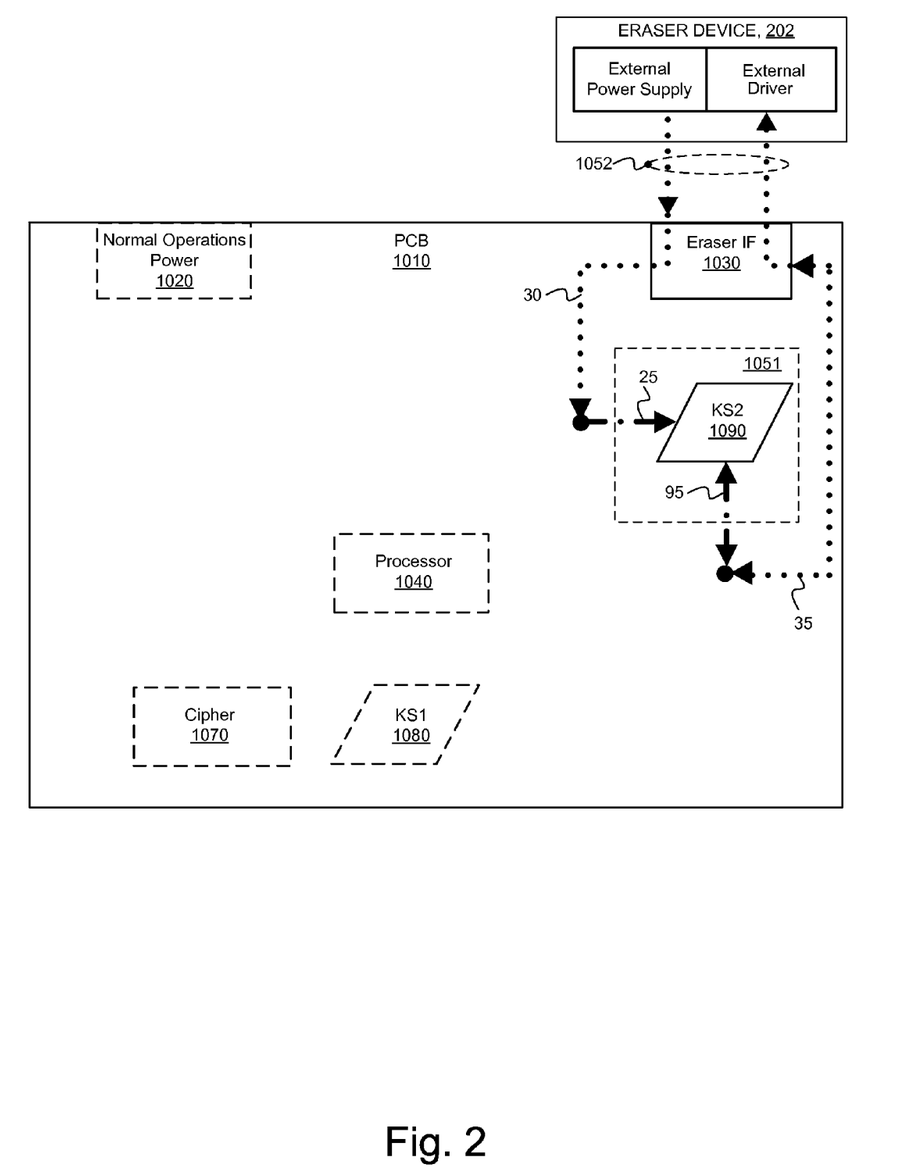
FIG. 2 illustrates the system of FIG. 1C, with the system operating in a key destruction mode.

FIG. 2 illustrates the system of FIG. 1C, with the system operating in a key destruction mode.

In the key destruction mode, the PCB is powered off (such as by powering off the storage device). Any or all key material in KS2 1090 is destroyed (such as by zeroizing) by breaking the protected facility sealing External Interface 1030, and coupling Eraser Device 202 to the External Interface. The Eraser Device supplies power to KS2 using an included External Power Supply. The Eraser Device issues one or more commands to zeroize all or any portion of key storage of KS2 (such as via erase and/or write commands) using an included External Driver. The commands are sent from the Eraser Device to the External Interface and then to KS2 via any convenient interconnection technology (such as an $I^2C$ bus). The Eraser Device is enabled to supply power and send commands to KS2 when one or more faults have occurred in the storage device and/or the PCB. The faults include lack of operating power, failure of a component of the PCB (such as any of the elements illustrated as part of PCB 1010 in FIG. 1C), failure of wiring between the components, and other malfunctions preventing the storage device from properly accessing storage data.

Any data stored on the storage device, and encrypted via the key material in KS2 that is destroyed by the Eraser Device, is no longer accessible, as the destroyed key material is needed to decrypt the data. Therefore destruction of the key material provides secure erasure of the data encrypted with the destroyed key material.

In some embodiments, the zeroizing includes erasing and overwriting with a non-secret pattern all or any portion of the key material in KS2 1090, such as in compliance with DoD 5220.22-M or another secure erase standard. In some embodiments, secure erasure of a storage device includes resetting of formatting and/or mapping information, for example to enable proper interpretation of zeroized information as representing an erased device and/or to prevent decryption with an incorrect cipher key. In some embodiments, the resetting is similar to all or any portion of operations performed by certain storage management commands (such as a TRIM command or an erase flash command).

According to a particular embodiment and scenario, the contents of the SSD 101 of FIG. 1A are normally encrypted in a manner that permits normal use in conjunction with a password or other authentication scheme. The encryption also enables ready cryptographic erasure. For this drive, the corresponding cryptographic keys are zeroized prior to shipping/moving the drive from a trusted/restricted site for servicing/repair, for inter-departmental transfer (such as inventory returns or as surplus), or other purpose where the drive's contents are not the purpose of the drive being shipped/moved, and when the drive contents are known to be sensitive/confidential or must be assumed so in accordance with a security protocol. The zeroizing of the keys performs the cryptographic erasure, guarding against the possibility that the password/authentication scheme has or can be compromised.

Prior to leaving the trusted site, the security seal or seals of the drive are first inspected. If the seal or seals have been compromised, it is viewed as unsafe to allow the drive to leave the trusted site, as KS2 could have been copied enabling later substitution. If the seal or seals are intact, then key zeroizing is next performed before the drive is permitted to leave. When the drive is functioning normally, the processor is easily programmed to at a minimum zeroize the cryptographic key material in one or both of KS1 and KS2. However, particularly for servicing/repair, portions of the drive may not be operating normally, making it impossible to zeroize the cryptographic keys via the processor. Under such circumstances, the key destruction mode enables readily zeroizing KS2, which is sufficient to perform the cryptographic erasure. Without the key destruction mode, it might be necessary to substantially (and possibly quasi-destructively) mechanically alter the drive, such as by removal of the NVM 199, to insure unauthorized access to the contents of the drive.

Alternate Embodiments

In some embodiments, KS2 is implemented on a removable component (such as a card having flash memory, an external security device, or a smartcard), and the PCB includes an interface compatible with the removable component. While the removable component is coupled to the compatible interface (such as via insertion into a suitable plug, slot, or other opening provided on the storage device), data encryption/decryption proceeds using key material stored on the removable component. In particular embodiments, the removable component and compatible interface are selected for low-cost, a simple interface, and a small-footprint. In further particular embodiments, the removable component is considered sacrificial, and it is selected to minimally provide for non-volatile retention of KS2 and replacement at low cost. Removing the removable component (e.g. by decoupling the removable component from the PCB) enables data erasure, as key material on the removable component is no longer available to decrypt data. Destroying the removable component (such as mechanically or electrically) enables secure data erasure, as it is no longer possible to decrypt the data. A seal (such as applied while the removable component is coupled to the printed circuit board) enables discovery of removal of the removable component from the printed circuit board, thus enabling tamper detection. In various embodiments, all or any portion of the removable component and the compatible interface (such as all or any portion of a device case or an enclosure) are security sealed at a trusted site. In some embodiments, the sealing is compliant with a security standard, such as FIPS 140.

Figure 3:
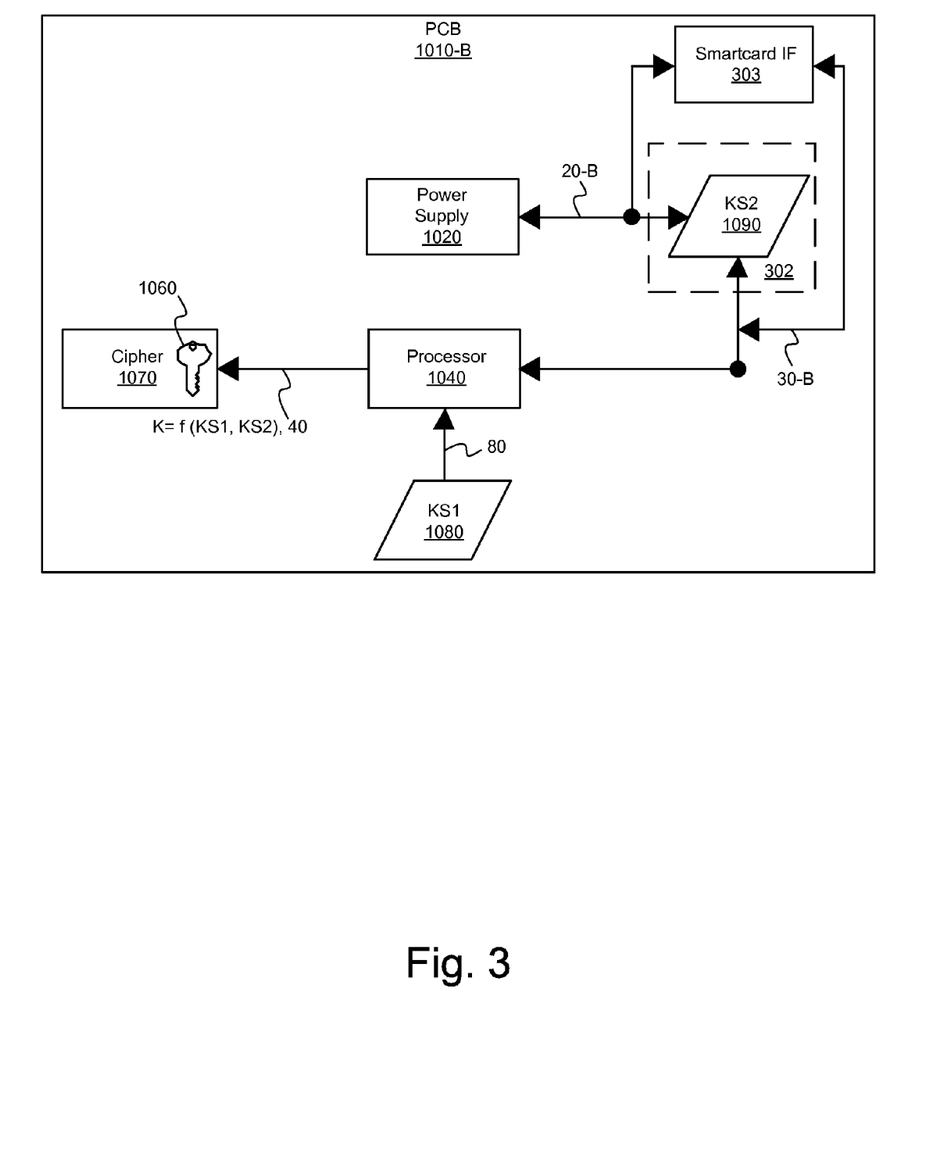
FIG. 3 illustrates selected details of an embodiment of a system providing encryption key destruction for secure data erasure via physical removal of key information, with the system operating in a storage device mode.

FIG. 3 illustrates selected details of an embodiment of a system providing encryption key destruction for secure data erasure via physical removal of key information, with the system operating in a storage device mode. Elements of FIG. 3 are similar to FIG. 1C, except Key Storage KS2 is implemented via Smartcard 302 electrically and mechanically coupled to Smartcard Interface 303. In some embodiments, a seal is optionally used to detect removal of the removable component. According to various embodiments, the non-volatile memory, compatible socket, and interface may be a removable memory card (including, but not limited to MMC, SD, miniSD, microSD, and variants), other serial flash or EEPROM memory (including but not limited to SPI or I2C interfaces), and other non-volatile types.

Figure 4:
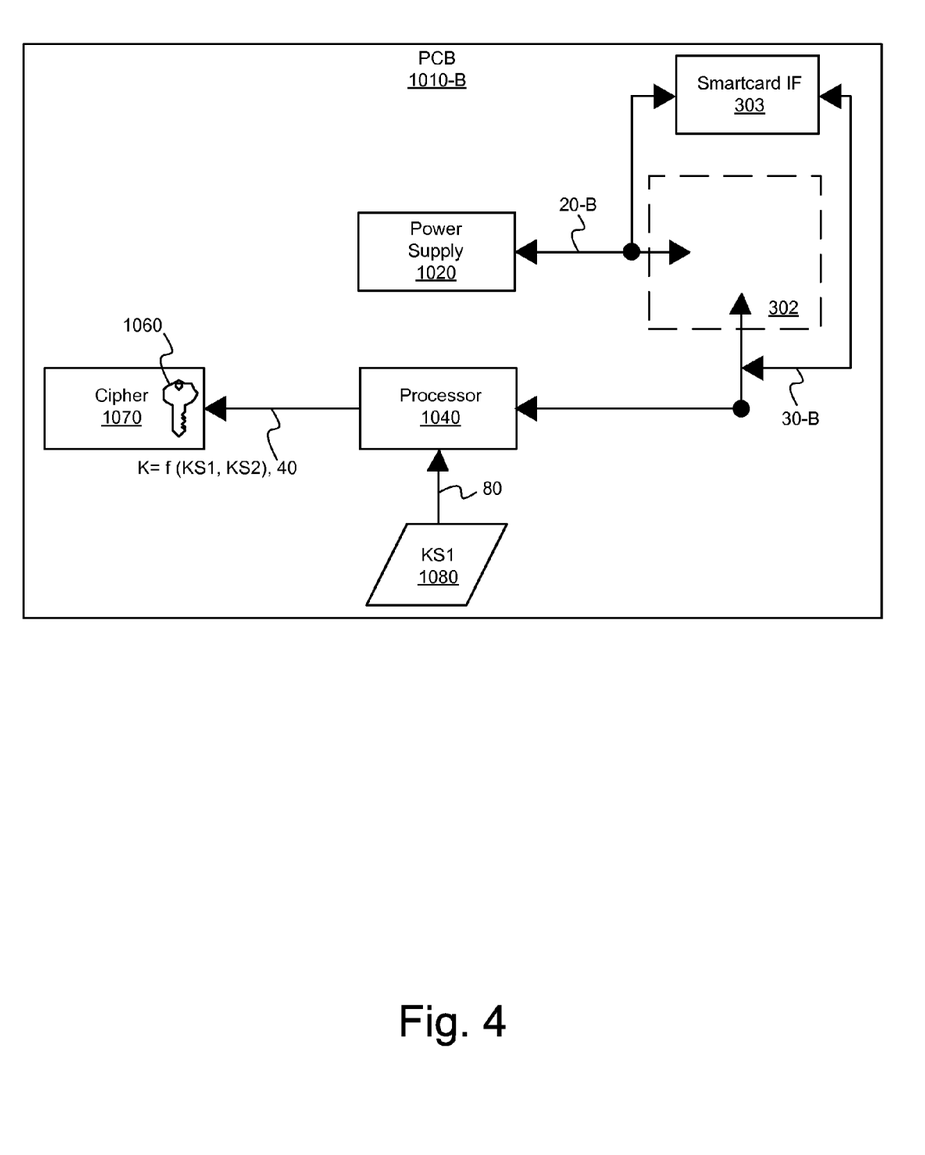
FIG. 4 illustrates the system of FIG. 3, with the system operating with key information physically removed.

FIG. 4 illustrates the system of FIG. 3, with the system operating with key information physically removed. The Smartcard has been removed, thus disabling access to any data encrypted using key material on KS2, as the encrypted data is no longer accessible without the key material. In some usage scenarios and or embodiments, the Smartcard is destroyed, such as by mechanical or electrical techniques, to permanently prevent decryption of the encrypted data, thus providing secure erase of any data encrypted with the destroyed key material.

Additional Implementation Details

Figure 5:
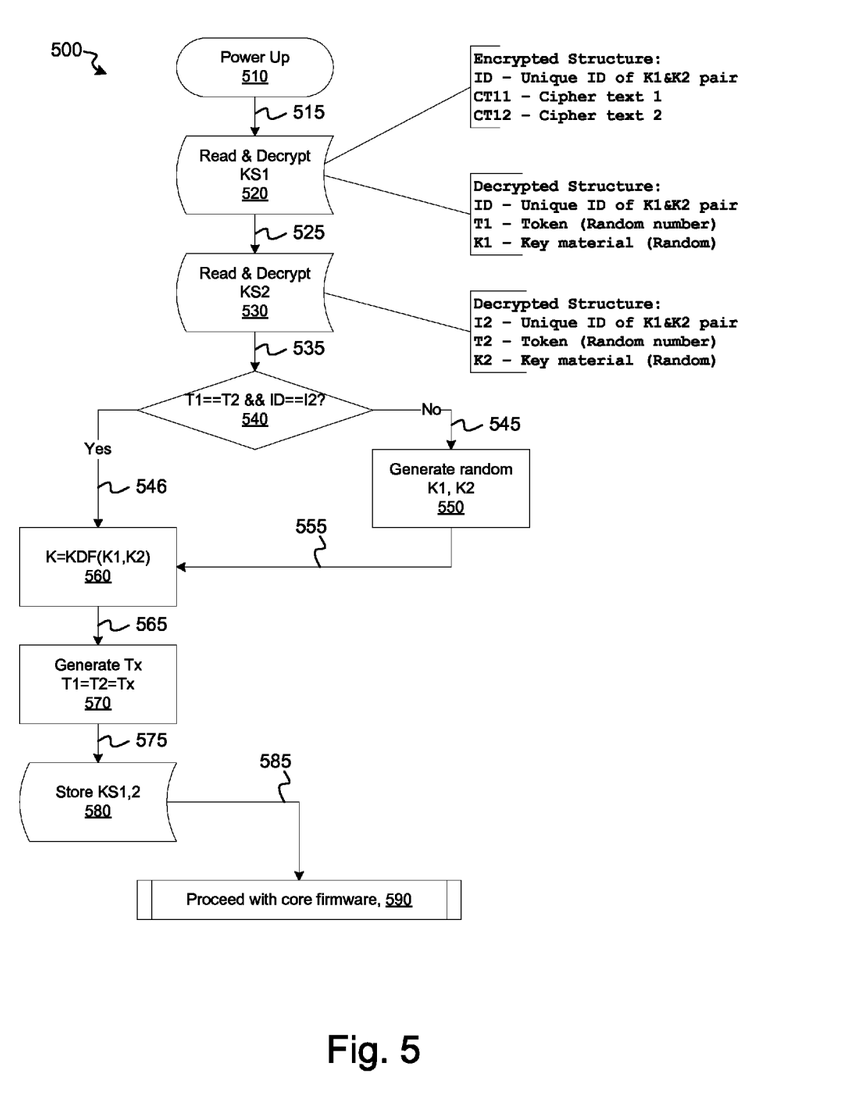
FIG. 5 illustrates selected details of an embodiment of powering up and booting firmware implementing cryptographic functions.

FIG. 5 illustrates selected details of an embodiment of powering up and booting firmware implementing cryptographic functions. In various embodiments, the cryptographic functions enable, for example, encryption/decryption of data according to key information stored in Key Storage KS1 and Key Storage KS2, as performed by systems as illustrated in FIG. 1C and/or FIG. 3.

Example Implementation Techniques

In some embodiments, various combinations of all or portions of operations performed by a secure erasing device (such as Eraser Device 202 of FIG. 2), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A storage device comprising:
    an external interface enabled to couple to a host via a storage interface protocol;
    a data storage medium;
    a Non-Volatile Memory (NVM) containing a cryptographic key, the NVM coupled to one or more elements of the storage device such that the NVM is a part of a removable component physically separate from the data storage medium, and the removable component is sealed with a seal while coupled to the elements to enable tamper detection;
    a logic circuit enabled to encrypt/decrypt data stored into/read from the data storage medium using the cryptographic key; and
    wherein any of the data encrypted using the cryptographic key and kept stored in the data storage medium is rendered inaccessible by erasure and/or destruction of the NVM.

2. The storage device of claim 1, wherein removal of the removable component results in the seal being broken.

3. The storage device of claim 1, wherein the removable component is compatible with a form factor of at least one of
    a Smartcard,
    a USB storage component,
    a CF storage component,
    an MMC storage component,
    an SD storage component,
    a Memory Stick storage component, and
    an xD-picture card storage component.

4. The storage device of claim 1, wherein the data storage medium comprises non-volatile memory technology.

5. The storage device of claim 1, wherein the data storage medium comprises rotating disk technology.

6. A system comprising:

a storage device enabled to encrypt and decrypt data according to a cryptographic key stored at least in part in an included Non-Volatile Memory (NVM), the storage device having an external interface to the NVM;

an eraser device, physically separate from the storage device, and enabled to couple to the external interface;

wherein the eraser device, when coupled to the external interface, is further enabled to destroy at least the part of the cryptographic key, the destroying comprising providing operating power to the NVM; and wherein any of the data encrypted using the cryptographic key and kept stored in the storage device is rendered inaccessible by the destroying.

7. The system of claim 6, wherein the destroying comprises at least partial overwriting of the NVM with a non-secret pattern.

8. The system of claim 6, wherein the destroying comprises at least partial zeroizing of the NVM.

9. The system of claim 6, wherein the destroying comprises at least partial erasure of the NVM.

10. The system of claim 6, wherein the eraser device is further enabled to perform the destroying when one or more components of the storage device are inoperable.

11. The system of claim 6, further comprising a data storage memory storing at least a portion of encrypted data of the storage device.

12. The system of claim 11, wherein the NVM is a first NVM, the data storage memory is a second NVM, and the cryptographic key is determined at least in part in accordance with one or more programming counts associated with one or more physical blocks of the second NVM.

13. The system of claim 11, wherein the data storage memory comprises a rotating disk.

14. The system of claim 6, wherein the storage device is sealed in a mechanical enclosure having a seal that is broken to couple the eraser device to the storage device.

15. The system of claim 6, wherein the cryptographic key is determined at least in part in accordance with one or more addresses associated with all or any portion of the data.

16. A method comprising:

coupling an eraser device to an external interface of a storage device, the eraser device being, before the coupling, physically separate from the storage device, the external interface being to a Non-Volatile Memory (NVM) of the storage device;

destroying, via the coupled eraser device, cryptographic material stored in the NVM, the destroying comprising providing operating power to the NVM;

wherein the storage device is enabled to encrypt and decrypt data at least in part according to the cryptographic material; and wherein any of the data encrypted using the cryptographic material and kept stored in the storage device is rendered inaccessible by the destroying.

17. The method of claim 16, wherein the destroying comprises at least partial overwriting of the NVM with a non-secret pattern.

18. The method of claim 16, wherein the destroying comprises at least partial zeroizing of the NVM.

19. The method of claim 16, wherein the destroying comprises at least partial erasure of the NVM.

20. The method of claim 16, further comprising repairing the storage device after the destroying.

21. The method of claim 16, wherein the storage device is sealed in a mechanical enclosure having a seal, and performing the coupling comprises breaking the seal.

22. The method of claim 16, further comprising determining the cryptographic material at least in part in accordance with one or more addresses associated with all or any portion of the data.

23. The method of claim 16, wherein a data storage memory is used to store at least a portion of encrypted data of the storage device.

24. The method of claim 23, wherein the NVM is a first NVM, the data storage memory is a second NVM, and the cryptographic material is determined at least in part in accordance with one or more programming counts associated with one or more physical blocks of the second NVM.

25. The method of claim 23, wherein the data storage memory comprises a rotating disk.

26. A system comprising:

an eraser device enabled to couple to an external interface of a storage device, the eraser device being physically separate from the storage device, the external interface being to a Non-Volatile Memory (NVM) of the storage device;

means for destroying, when the eraser device is coupled to the storage device via the external interface, cryptographic material stored in the NVM, the means for destroying being comprised in the erasure device, and the means for destroying comprising means for providing operating power to the external interface and the NVM;

wherein the storage device is enabled to encrypt and decrypt data at least in part according to the cryptographic material; and wherein any of the data encrypted using the cryptographic material and kept stored in the storage device is rendered inaccessible by the destroying.

27. The system of claim 26, wherein the means for destroying implements any one or more of at least partial overwriting of the NVM with a non-secret pattern, at least partial zeroizing of the NVM, and at least partial erasure of the NVM.

* * * * *